United States Patent [19]

Piotrowski

[11] 3,960,381
[45] June 1, 1976

[54] SEAL METHOD AND APPARATUS

[75] Inventor: Tadeusz Wiktor Piotrowski, Cincinnati, Ohio

[73] Assignee: Cincinnati Milacron, Inc., Cincinnati, Ohio

[22] Filed: Oct. 30, 1975

[21] Appl. No.: 627,147

[52] U.S. Cl. .................................. 277/1; 277/94; 277/95; 277/166; 29/148.4 S
[51] Int. Cl.² ................... F16J 15/34; B23P 11/00
[58] Field of Search ............... 277/94, 95, 166, 1; 29/DIG. 34, 148.4 S

[56] References Cited
UNITED STATES PATENTS

| | | | |
|---|---|---|---|
| 2,231,947 | 2/1941 | Rich | 277/94 |
| 2,422,414 | 6/1947 | Hoier | 90/21.5 X |
| 2,656,013 | 10/1953 | Ellithorpe | 277/166 X |
| 3,713,659 | 1/1973 | Derman et al. | 277/95 |
| 3,828,411 | 8/1974 | Zahn | 29/148.4 S |

Primary Examiner—Samuel B. Rothberg
Attorney, Agent, or Firm—Thomas M. Farrell

[57] ABSTRACT

A base member has an exterior peripheral surface and has an interior chamber. An elastomeric band is stretched to fit over a portion of the peripheral surface and a portion of the band is allowed to extend beyond the peripheral surface of the base member so that the extension of the band is unrestrained and it thereby tends to reassume its relaxed position and while doing so, it forms a stable curl, or bight, about the edge of the peripheral surface. A plate is carried by a member which is relatively movable with respect to the base member, and the plate bears on the bight of the elastomeric band so as to form a sealed chamber within the base member while the plate is both rotated and moved toward and away from the base member; the bight of the elastomeric band being compliant to the movable plate, and tending to return to its stable position.

4 Claims, 6 Drawing Figures

SEAL METHOD AND APPARATUS

BACKGROUND OF THE INVENTION

It is very necessary in machinery and other elements which use parts having relative rotation, to protect interior mechanisms from deleterious effects which may be caused by the entry of contaminates and particulate matter from the surrounding environment.

Many prior art seals have been developed to seal the interface of relatively rotatable elements. Such seals usually comprise a stiff elastomeric ring which is molded and carried in a casing in one of the relatively movable elements, and having a seal lip which bears on a precision diameter of the other member. Many times it is not possible or desirable to seal a movable member on a diameter, but rather is preferable to seal on a face of a rotatable member. Face seals on rotating members are generally very expensive and complex in construction as well as being sometimes difficult to manufacture, since they usually comprise a spring-loaded, low friction, element in a casing which bears against the smooth sealing face on the relatively rotating member, and such sealing devices do not readily adapt themselves for relative axial movement between a shaft and a housing, because they are designed for installation to a preset dimension only.

The prior art large diameter seals are generally very expensive to purchase since they involve special molds to create the sealing element and the mold set up charges are significant, especially for non-standard custom seals. The face seals which are available are very expensive as well and also require a substantial space and precision to mount them.

Applicant has obviated the difficulty involved in the prior art devices for sealing large surfaces which must rotate relative to a stationary housing and must have provision for axial movement of the surface toward and away from the housing.

It is therefore an object of the within invention to provide a seal which is inexpensively manufactured for a variety of installations.

It is another object of the within invention to provide a seal which is capable of sealing relatively rotating bodies yet permits the one body to move toward and away from the other body while effecting a seal between the two, requiring only a low level of precision between the elements.

SUMMARY OF THE INVENTION

In the within invention, an environmental seal assembly is accomplished by providing a peripheral exterior surface around the base member of a machine tool which has located therein a rotatable spindle carrying a work table with a plate on its bottommost surface. The plate is disposed toward the base member, and a seal is accomplished between the base member and the plate by providing an elastomeric band which, when relaxed, is of lesser dimension than the peripheral surface on the base member. The elastomeric band is stretched over the peripheral surface between the base member and the plate at one portion of its width, and the other portion of its width is unrestrained, thus allowing the other portion of the elastomeric band to tend to return to its relaxed state. In doing so, the elastomeric band forms a stable curl or bight about the topmost edge of the base member.

The plate touches on the bight of the elastomeric band and thereby effects a seal of the inner chamber of the base member from the environment. While using the elastomeric band as a seal element, relative rotation may occur between the plate and the base member, as well as relative axial movement between the two members. Thus, as the plate is moved toward and away from the base member the elastomeric band is compliant and tends to return to its stable curl so as to bend with the movement of the plate and effect continuous sealing at all intermediate positions between the topmost and lowermost positions of the plate relative to the base member.

DESCRIPTION OF THE PREFERRED EMBODIMENT

Figure 1:
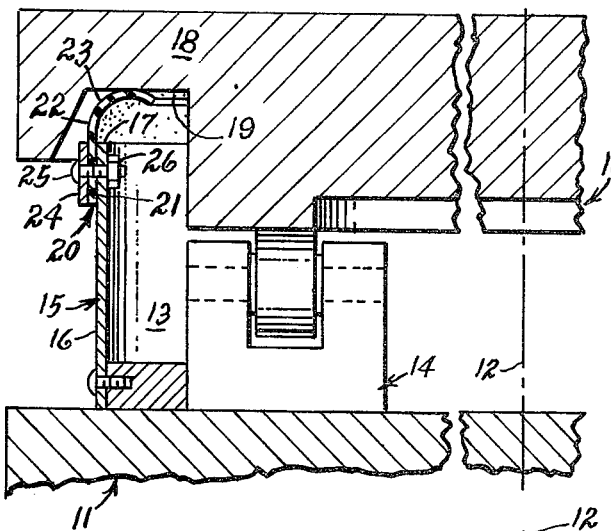
FIG. 1 is an elevational section through a machine table showing the bottommost plate surface of the table, base member of the machine tool, and elastomeric band which has been deformed about the base member to effect a seal between the base member and the plate.

Turning now to the drawings and particularly to FIG. 1 thereof, there is shown a machine tool table 10 which is relatively rotatable with respect to a machine tool base member 11 upon an axis 12 through the two members 10, 11. A chamber 13 is formed within the base member 11 which includes the mechanism 14 for transporting and driving the machine tool table 10. The base member 11 includes a vertical diameter 15, in this case, which is concentric with the axis 12 of rotation of the table 10, and the diameter 15 forms a continuous peripheral exterior surface 16 on the base member 11. The top 17 of the surface 16 of the diameter 15, terminates a distance below and removed from a plate portion 18 of the rotary table 10. The plate portion 18 of the rotary table 10 has a seal surface 19 in the plane of rotation which is disposed downward towards the base member 11 to form a top surface for enclosing the chamber 13.

In order to effect a seal between the seal surface 19 and the base member 11, an elastomeric band 20 is utilized to provide a continuous seal around the peripheral surface 16 of the base member 11 between the base member 11 and the seal surface 19 of the plate portion 18 of the table 10. The elastomeric band 20 has a continuous band length which, when relaxed, is of lesser dimension than the length of the peripheral surface 16, and the band 20 is stretched so that as one portion 21 of the band width is fitted over the peripheral surface 16 and allowed to contract thereon, the remaining portion 22 which overhangs the peripheral surface 16 will tend to return to its relaxed position, thereby assuming a stable curl, or smooth annular bight 23, about the top 17 of the peripheral surface 16.

The bight 23 of the elastomeric band 20, is compliant, in that it may be deflected by pushing on the bight 23, and it will tend to spring back to the stable position when the pushing force is removed. This principle is used to form a seal by virtue of the fact that the dimensions and other perameters of the elastomeric band 20 and peripheral surface 16 are of such relationship that in normal use, the seal surface 19 of the plate portion 18 of the table 10 bears on the continuous annular bight 23 of the elastomeric band 20.

This arrangement permits relative rotation to occur between the plate 18 and the base member 11 while insuring that the bight 23 of the elastomeric band 20 remains in contact with the seal surface 19. Further, as depicted in FIG. 1 and as will be discussed later in FIG. 3, the plate 18 may be lowered towards the base member 11, deflecting the bight 23 of the elastomeric band 20 inward, tending to increase the amount of curl. Thereafter, as the plate 18 is raised back to its uppermost position, the bight 23 of the seal will follow the plate 18 upward, maintaining contact.

A clamp band 24 is provided around the exterior of the stretched portion 21 of the elastomeric band 20 to clamp it to the peripheral surface 16, and screws 25 and nuts 26 are inserted through the members 15,20,24 to secure them together. It may be seen that alternative clamp means may be used, when required, and in some instances, friction of the band on the surface may suffice.

Figure 2:
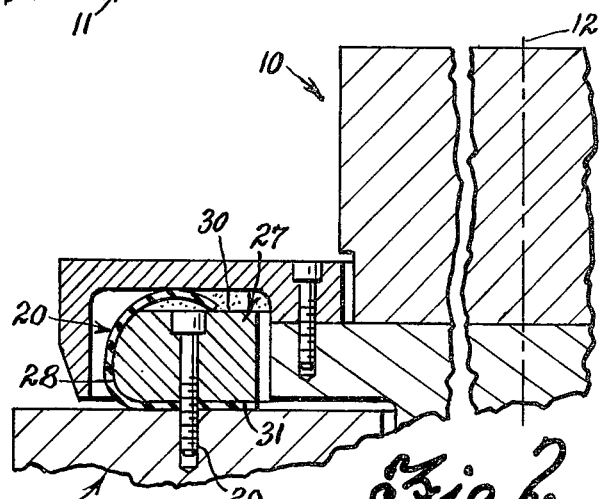
FIG. 2 is an alternative embodiment of FIG. 1 illustrating an alternative clamping means on the base member.

FIG. 2 depicts an alternative form of clamping the elastomeric band 20 to the base member 11. In this case, a lower total stack height of the elements may be achieved simply by providing the base member 11 with a ring 27 which has a peripheral surface 28 about its exterior, upon which the elastomeric band 20 is stretched as in FIG. 1, but the ring 27 is of a shallow height, having screws 29 passing axially through its top face 30, and the elastomeric band 20 is drawn around the bottom 31 of the ring 27 and held between the ring 27 and the base member 11 as the ring 27 and base member 11 are clamped together with screws 29. In all other features, the sealing function of this alternative embodiment is identical to that described in FIG. 1.

Figure 3:
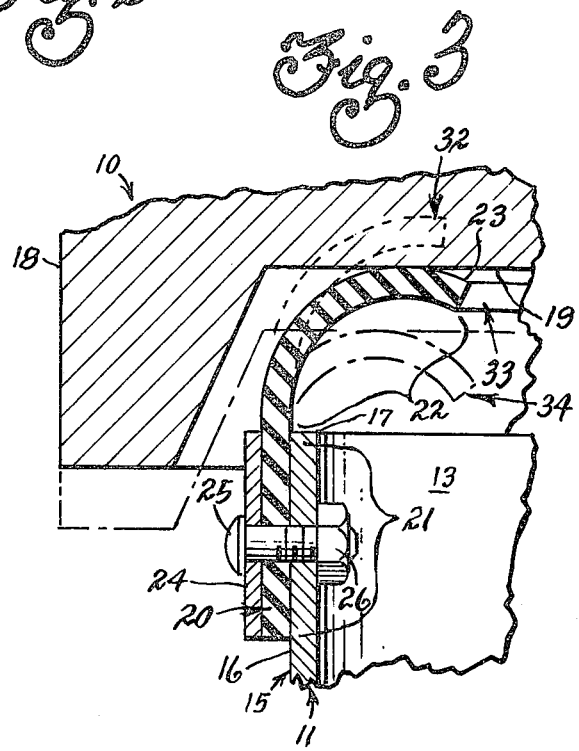
FIG. 3 is an enlarged elevational section through the base member, elastomeric band, and plate of FIG. 1, illustrating movement between the base and plate and compliance of the elastomeric band.

Turning now to FIG. 3, we see an enlarged section through the sealing assembly of FIG. 1, showing the plate portion 18 of the table 10 having its sealing surface 19 contacting the bight 23 of the elastomeric band 20. The band 20 has been stretched so that a portion 21 is held in a stressed position about the peripheral surface 16 of the base member 11, and the bight 23 of the band 20 is shown by a dotted outline 32, which is a stable naturally-assumed, position of the band 20 as it tends to return to its relaxed position. When the elements are in their normal assembled heights, relative to one another, the seal surface 19 of the plate portion 18 deflects the bight 23 of the band 20 to the solid position 33 shown in FIG. 3, so that the deflection force is met by the reaction of the compliant seal band 20, and the band bight 23 tends to stay in contact with the seal surface 19. When the plate 18 is lowered towards the base member 11, as depicted by the phantom line of the seal surface 19, the bight 23 of the elastomeric band 20 will be deflected to the phantom position 34 shown in FIG. 3, and it may be seen that constant contact is had between the bight 23 and the seal surface 19. Thereafter, as the plate portion 18 is raised to its topmost position away from the base member 11, the bight 23 of the band 20 will tend to follow the seal surface 19 because of the inherent springiness of the material.

Figure 4:
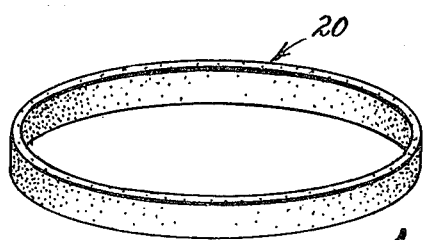
FIG. 4 is isometric view of the relaxed elastomeric band.

FIG. 4 illustrates the elastomeric band 20 in its unstressed, relaxed state, whereby it may be seen that the band 20, which is comprised of an elastomeric material, is thin relative to its width and length, and the band 20 may be manufactured by a variety of methods, such as cutting a ring of material from a tube, or simply by taking a strip of elastomeric sheet material and fusing the ends together to form the band 20.

Figure 5:
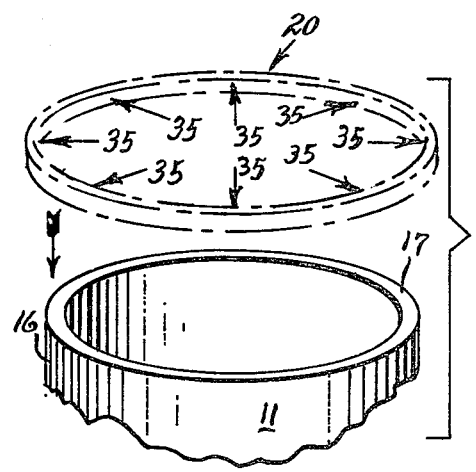
FIG. 5 is an isometric view indicating mounting of the elastomeric band to the base member.
Figure 6:
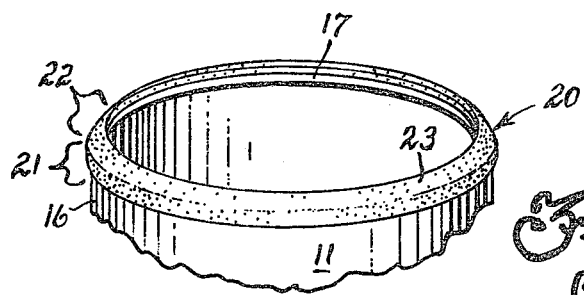
FIG. 6 is an isometric view showing the elastomeric band mounted to the base member.

In FIG. 5 the assembly of the elastomeric band 20 to the base member 11 is accomplished by stressing the band 20 outwardly in the direction of the arrows 35, and fitting it over the top 17 of the peripheral surface 16, of the base member 11. Thereafter, in FIG. 6, it may be seen that the elastomeric band 20 will be held taut for a portion 21 of its width about the peripheral surface 16 of the base member 11, while the portion 22 of the band 20 which extends beyond the peripheral surface 16 will tend to return to its relaxed state and therefore form a stable curl, or bight 23, about the topmost end 17 of the peripheral surface 16. When the machine elements are assembled as depicted in FIG. 1, the plate portion 18 has its seal surface 19 impressed on the bight 23 of the elastomeric band 20, and the inner chamber 13 of the base member 11, is thereby sealed from the environment.

What is claimed is:

1. An environmental seal assembly, comprising in combination:
    a. a base member, having a chamber formed therein which is bounded by a continuous peripheral exterior surface on said base member;
    b. a plate, rotatably carried with respect to said base member, having a seal surface in the plane of rotation disposed towards said base member so as to provide a surface for enclosing said chamber; and
    c. an elastomeric band, having a continuous band length which, when relaxed, is of lesser dimension than said peripheral surface, and further having a band width comprising a first portion and a second portion, wherein said first portion is stressed and fitted over said peripheral surface, and said second portion is free of restraint, said second portion tending to curl and form a stable smooth annular bight, and further wherein said plate seal surface is in contact with said bight, thereby forming a sealed chamber bounded by said base member, said band, and said plate.

2. The seal assembly of claim 1, further comprising means to clamp said first portion of said band to said peripheral surface.

3. The seal assembly of claim 2, wherein said plate is movable from a first, proximal, position to a second, distal, position relative to said base member and further wherein said seal surface of said plate continuously engages said bight at each of said first and second positions and at all intermediate positions, to seal said chamber.

4. In a machine having a base member with an interior chamber and an exterior continuous peripheral surface, and further having a plate capable of relative movement with respect to said base member wherein the plate has a seal surface disposed towards said base member, the method of forming an environmental seal assembly comprising the following steps:

a. stretching a continuous elastomeric band to a dimension larger than said peripheral surface;
b. fitting a portion of said band over an edge portion of said peripheral surface;
c. contracting said band, wherein said portion of said band is held taut on said surface, and the remaining portion of said band forms a stable annular bight about an edge of said peripheral surface; and
d. impressing said seal surface against said bight throughout assembled working dimensions of said relative movement.

* * * * *